United States Patent [19]

Gosc et al.

[11] Patent Number: 5,274,676
[45] Date of Patent: Dec. 28, 1993

[54] MULTI-STANDARD SYNCHRONIZING SIGNAL RECOVERY SYSTEM

[75] Inventors: Paul M. Gosc, Buffalo Grove; Manish Pradhen, Rolling Meadows; Khosro M. Rabii, Arlington Heights, all of Ill.

[73] Assignee: Zenith Electronics Corporation, Glenview

[21] Appl. No.: 790,935

[22] Filed: Nov. 12, 1991

[51] Int. Cl.$^5$ .............................................. H04L 7/00
[52] U.S. Cl. ................................... 375/106; 375/118; 358/148
[58] Field of Search ............................. 375/111, 118; 370/105.3, 105.4, 105.5, 106, 269; 358/148

[56] References Cited

U.S. PATENT DOCUMENTS 4,637,016  1/1987  Ciancibello et al. ............... 370/29
4,688,217  8/1987  Ishi et al. ......................... 375/111 X Primary Examiner—Curtis Kuntz
Assistant Examiner—Tesfaldet Bocure

[57] ABSTRACT

A method of operating a multi-standard noise immune sync pulse recovery system establishes a time window during which a sync pulse is expected. The count of a counter is stored when a sync pulse occurs as expected, the counter is reset and a sync output is generated. Successive sync pulses occurring as expected are verified by comparison with the stored counts. When a first predetermined number of successive sync pulses occur as expected, a state of periodicity is established for the signal. The window is progressively narrowed to optimize the system noise immunity responsive to a second predetermined number of sync pulses occurring as expected. Sync outputs are generated in the place of expected sync pulses that do not occur during the window when the system is in the state of periodicity. The state of periodicity is lost when a third predetermined number of sync pulses do not appear as expected and the window is progressively widened.

7 Claims, 2 Drawing Sheets

MULTI-STANDARD SYNCHRONIZING SIGNAL RECOVERY SYSTEM

BACKGROUND OF THE INVENTION AND PRIOR ART

This invention relates generally to synchronizing (sync) signal recovery systems and particularly to a digitally based synchronizing signal recovery system that is noise immune.

Synchronizing signal recovery systems are well known in the art, especially in connection with the recovery of synchronizing signals in transmitted television signals. With the advent of digital techniques and countdown circuits for developing synchronizing signals, new levels of accuracy and noise immunity are available in television receiver design. Additionally, the rise of computer technology and high resolution cathode ray tube display systems has fueled the need for synchronizing signal systems that operate on more than one frequency. These are generally referred to as multi-frequency or multi-standard synchronizing signal systems. Multi-frequency systems generally operate on the basis of developing a multiple or submultiple of a given clock frequency for generating appropriate synchronizing signals. It is of course imperative that any synchronizing system be capable of control or adjustment by the synchronizing signals in the received signal to assure that information is properly displayed. Thus it is standard to utilize a closed loop control system, such as a phase locked loop, for assuring that the regenerated sync pulses coincide with the syncs in the transmitted signals.

The present invention is directed to a multi-standard synchronizing signal recovery system that adjusts to the synchronizing pulses in the incoming signal, but is not frequency dependent. The system of the invention provides a high level of noise immunity since it looks for synchronizing pulses expected to occur in a narrow time window, which therefore increases the system noise immunity. On the other hand, the window is widened when seeking sync pulses, or when signal changes occur, for example, during a channel change in the television receiver. The system will also produce periodic output syncs in the absence of expected incoming syncs within the window for a time period depending upon the history of the received signal and produce minimum frequency (default signals) output sync in the absence of an incoming sync signal. With the system of the invention, sync drop outs because of noise impulses and the like are minimized.

OBJECTS OF THE INVENTION

A principal object of the invention is to provide an improved multi-standard synchronizing signal recovery system.

Another object of the invention is to provide a method of operating a noise immune, multi-standard synchronizing signal recovery system that is digitally based.

A further object of the invention is to provide a frequency independent digital multi-standard synchronizing signal recovery system.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
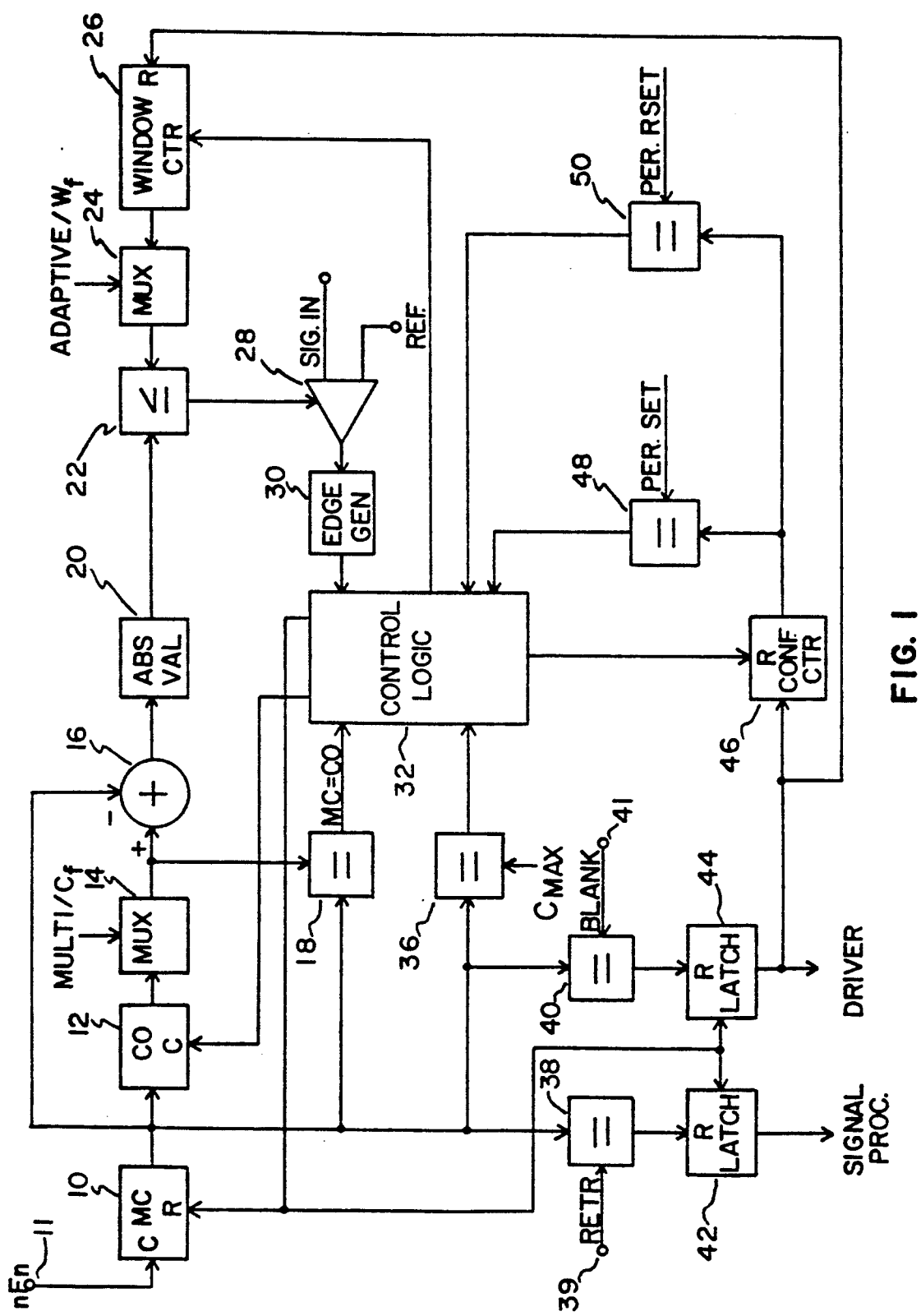
FIG. 1 is a simplified block diagram of a circuit for practicing the method of the invention.

Referring to FIG. 1, a master clock counter 10 is shown having a clock input supplied with a signal having a frequency of nFn at an input terminal 11. The frequency of nFn is selectable and is chosen to provide sufficiently high frequency clock pulses from the master clock 10 for operation over the frequency range of sync signals to be encountered. Master clock 10 is coupled to a sync pulse register 12, labelled CO, which retains or latches the number of clock pulses between the start of master clock 10 and the appearance of a sync pulse in the window, as will be explained. Register CO is coupled to a multiplex circuit 14 that has a multi/Cf supplied by a system microprocessor (not shown). Multi may be selected when the environment may have sync signals of different frequencies, whereas Cf is selected where the frequency of the incoming sync signal is known. The Cf mode simplifies and speeds up processing of the incoming sync signal. The output of MUX 14 is supplied to the positive input of an adder 16. The negative input of adder 16 is supplied with the output of master clock 10. Thus the output of adder 16 is CO-MC, where MC and CO represent the counts of the master clock 10 and CO register 12, respectively. MUX 14 also supplies a comparator circuit 18 that produces an output when both its inputs are equal. The other input is from master clock 10. Therefore the equality circuit 18 determines when the count of master clock 10 is equal to the number stored in sync pulse register CO and provides a signal to that effect to a control logic circuit 32. Control logic 32 supplies clock pulses to CO register 12 and to the reset terminal of master clock 10. As will be seen below, when the count of master clock 10 is equal to the number in CO latch 12, master clock 10 is reset to 0 by a signal from control logic 32.

The output of adder 16 is provided to an absolute value circuit 20 which in turn supplies a comparator circuit 22 that yields an output when the output of absolute value counter 20 is less than the output of a multiplexer 24 that is driven from a window counter 26. Multiplexer 24 is supplied with an input labelled adaptive/Wf and the window counter 26 is controlled by control logic 32. The Wf input is where a fixed size window is desired whereas the adaptive input enables the window opening and closing, as will be described. The adaptive/Wf input is also supplied from the system microprocessor. A gated amplifier 28 has two inputs, one supplied with a reference voltage source and the other which receives the incoming sync signal which in the preferred embodiment is a vertical sync signal. Amplifier 28 is enabled or gated by comparator circuit 22, which action defines the window. The output of amplifier 28 is coupled to an edge generator circuit 30 which supplies control logic 32 with synchronizing signal input pulses.

Another output of master clock 10 is coupled to a comparator circuit 36 that is also supplied with an input, labelled Cmax, that represents a maximum number of the master counter 10, which number extends beyond the widest window. As will be seen, Cmax gives rise to a default operation where minimum frequency sync outputs are generated in the absence of any incoming synchronizing signals to keep the receiver drive circuits (not shown) operating. Comparator circuit 36 produces an output when equality exists between its inputs and supplies a signal indicating this to control logic 32. The input of a confidence counter 46 is coupled to control logic 32 and in turn provides output signals to first inputs of a pair of comparator circuits 48 and 50, having second inputs, respectively, labelled periodicity set and periodicity reset. The outputs of comparators 48 and 50 supply signals to control logic 32 when their respective first and second input signals are equal.

Master counter 10 also supplies first inputs of another pair of comparator circuits 38 and 40 which receive as their second inputs, a vertical retrace pulse from a terminal 39 and a vertical blanking pulse from a terminal 41, respectively. When the respective input signals of comparator circuits 38 and 40 are equal, signals are supplied to a pair of latches 42 and 44, respectively, which provide output signals to the signal processing and driver circuits respectively, of a television receiver, none of which is illustrated since they are well known in the art. Latches 42 and 44 are supplied with reset pulses from control logic 32 and are enabled when the master clock 10 is reset to 0. Therefore, whenever the master clock 10 is reset to 0, a sync output is developed for the television receiver. The output signal from latch 44 is also supplied to confidence counter 46 and to the reset terminal of window counter 26.

The above described counter (and circuit arrangement) function to develop a time window, during which a vertical synchronizing pulse is expected, at the input of amplifier 28. The window is produced by window counter 26 under control of master clock 10 and control logic 32. When the window is established, comparator 22 enables amplifier 28 and input signals at the signal input terminal that exceed the reference level are passed to edge generator 30 where they are processed into an appropriate signal for control logic 32. Thus the upper portion of the circuit establishes a time window during which input signals exceeding a predetermined level are detected and supplied to control logic 32.

Figure 2:
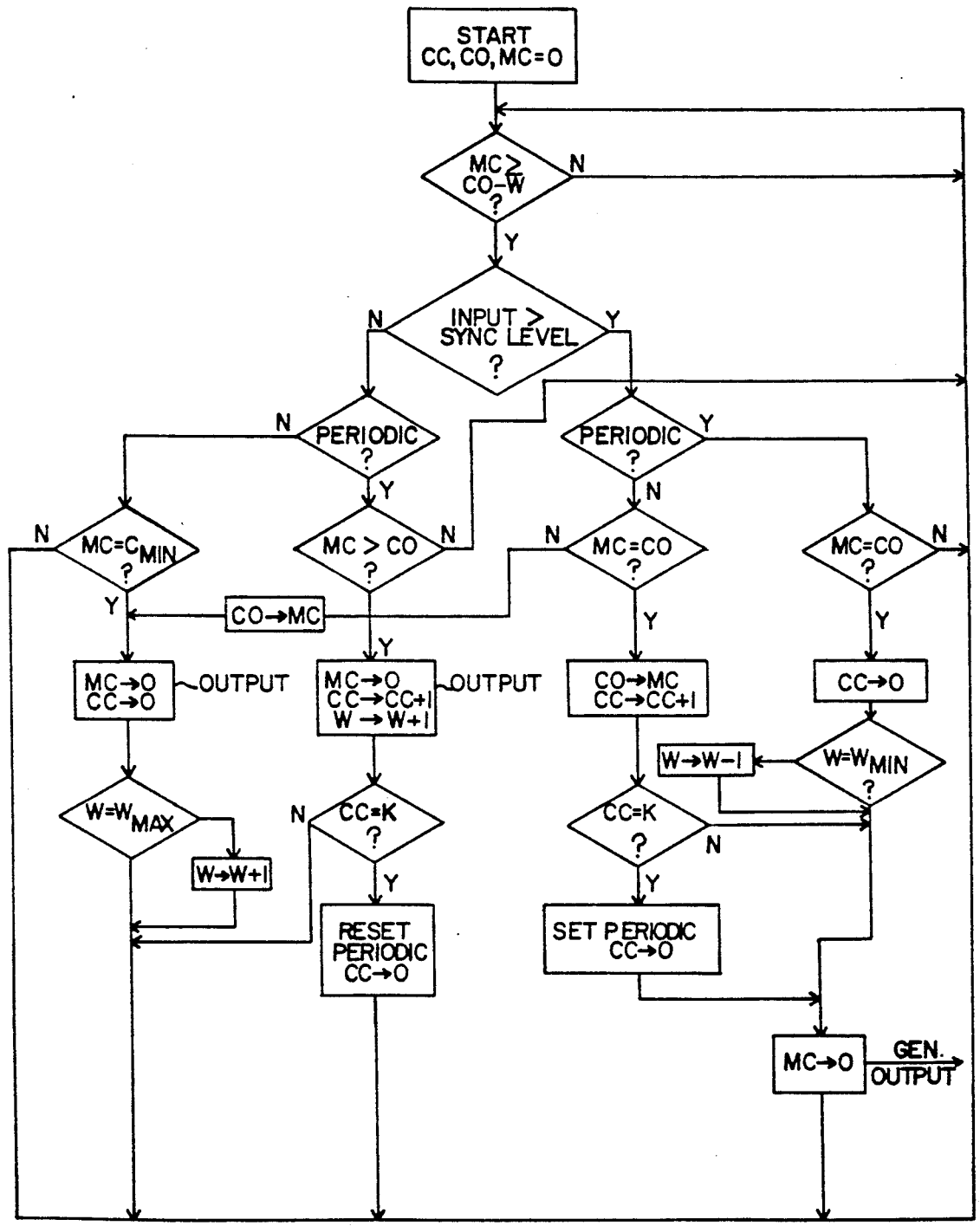
FIG. 2 is a flow chart illustrating the method of the invention.

In operation, master clock 10 begins counting and when a synchronizing pulse appears within the window, the count of master clock 10 is read into CO latch 12 and master clock 10 is reset to 0. It will be appreciated that a noise signal appearing within the window may also produce this result. When the master clock 10 is reset to 0, a sync output is developed by latches 42 and 44 for controlling appropriate synchronizing signal processing and deflection driver circuits in the television receiver. Because of the interrelationship of confidence counter 46 and the determination that the signal is periodic, i.e. establishment of a state of periodicity for the system, discussion of the narrowing of the time window is best understood by reference to the flow diagram of FIG. 2.

In the flow diagram, the count of the confidence counter 46 is indicated by the letters CC, the number in the sync latch is indicated by the letters CO and the count of the master clock 10 is indicated by the letters MC. At the outset, the confidence counter, the sync latch and the master clock are all set to 0. The initial inquiry is whether the master clock count is greater than or equal to the number in latch CO less the size of the window. Basically, the question is whether the window is open? It will be appreciated that the window is established at a time generally consistent with the expected arrival of synchronizing signals.

If the window is open, the next inquiry is whether the input signal is greater than the level of expected synchronizing signals, which in the FIG. 1 embodiment is determined by the reference source connected to amplifier 28. If the signal in the window is greater than the expected synchronizing signal level, then the question is whether a state of periodicity has been established for the system. Put another way, has the experience of the system with the signals appearing in the window resulted in a determination that the signal is periodic? Assuming that periodicity has not been established as yet, the inquiry is whether the count of the master clock 10 is equal to the count previously stored in sync latch CO. In short, did the new signal occur at the same time as the previous signal? If it did, the sync latch CO is reset to the count of the master clock (which will be the same count as previously stored) and the confidence counter is incremented by 1. The next inquiry is whether CC, the count of the confidence counter, is equal to a selected number "K". If not, the master clock 10 is reset to 0 (which produces a sync output) and the process is repeated. Successive input signals that occur in the window at the same time as previous synchronizing signals, i.e. when MC=CO, result in successive incrementing of the confidence counter until CC=K, at which point the incoming signal is determined to be periodic. The establishment of a state of periodicity for the system is accompanied by resetting the confidence counter (CC=0) and continuing in the loop with the master clock being reset to 0 and the system producing a sync output. For the next synchronizing pulse, the system is periodic and the flow chart branches to the right. If MC=CO, the confidence counter CC is reset to 0 and the window is progressively reduced in size for each successive pulse occurring as expected until a minimum window size is attained. Under normal steady state operations, the system is in a state of periodicity with a minimum time window. With a minimum time window, the noise immunity of the system is maximized since signals occurring outside the window are rejected.

The left side of the flow diagram covers situations where signals are not detected within the time window. Continuing with the illustration where the system is in a state of periodicity and has a minimum time window, assume that a synchronizing signal does not appear as expected in the window. On the flow diagram, the question of whether the input is greater than the sync level is answered "no". Since the system is in a state of periodicity, the next question is whether the master clock count is greater than the count in the latch. The inquiry is simply to determine whether the time window has passed without a signal appearing. Assuming that the time window has not passed, the flow diagram returns to beginning since the window is still open and a signal may yet occur.

Assuming the time window passes without a signal appearing, MC is greater than CO. Now the master clock is reset to 0 to generate a sync output at the appropriate time when the expected synchronizing pulse was to occur (albeit not in response to a received synchronizing pulse), the confidence counter is incremented by 1 and the window is widened (opened). The effect of this is a judgment by the system that it has been receiving a periodic signal and assumes that the signal is still periodic despite the expected synchronizing signal being missing. Note, however, that CO is not changed to match the count in master clock 10 but retains the count of the last periodic synchronizing pulse. If the confidence counter has not reached a level K (or any other selected level), the flow diagram returns to the beginning. Successive passages of the time window without the expected synchronizing pulse appearing results in sync outputs being supplied (effectively replacing expected, but missing synchronizing pulses) with the window being made progressively wider. This continues until the confidence counter attains a level at which confidence in the periodicity of the incoming signal is lost, the signal is determined to be not periodic and the state of periodicity is cancelled, that is a state of non-periodicity is established. This is accompanied by the confidence counter being reset to 0. If no signal in excess of the reference level is found with the system being not periodic and the count of the master clock not being equal to a maximum value Cmax, which would indicate that the window is passed, the system continues seeking. Each time the window passes without a signal appearing and MC=Cmax, the master clock is reset to 0, the confidence counter is set to 0 and if the window is not equal to its maximum value, it is incrementally widened until it is opened to its maximum. The provision of a Cmax maximum value for the master clock enables a default drive sync output for the system which sync output occurs whenever the master clock is reset to 0. The number Cmax thus determines the lowest operating frequency for the synchronizing signal recovery system.

It will be noted that the system is substantially frequency independent and will adapt to any incoming periodic synchronizing signals. When the incoming signal is periodic, the noise immunity of the system is optimized by closing down or narrowing the time window during which synchronizing signals are expected thus effectively shutting out noise. For brief periods of interruption where the synchronizing signal does not arrive when expected, a sync output is supplied at a time when the synchronizing signal was expected until a level of no confidence is reached and the signal is determined to be no longer periodic. On the preferred embodiment, the window is progressively opened before the determination of a periodicity is made but that is a matter of design choice.

What has been described is a novel, multi-standard sync recovery system that has enhanced noise immunity and is substantially independent of incoming sync signal frequency. It is recognized that numerous changes in the described embodiment of the invention will be apparent to those skilled in the art without departing from its true spirit and scope. The invention is to be limited only as defined in the claims.

What is claimed is:

1. A method of operating a noise immune synchronizing signal recovery system comprising:
establishing a window within which a synchronizing signal is expected to appear;
generating a sync output responsive to the appearance of said synchronizing signal as expected;
placing said system in a state of confidence responsive to a plurality of successive synchronizing signals appearing in said window as expected;
while said system is in said state of confidence, reducing the window to a minimum responsive to successive synchronizing signals appearing as expected;
while said system is in said state of confidence, generating a sync output for synchronizing signals that do not appear as expected; and
removing said state of confidence and enlarging said window responsive to a given number of synchronizing signals that do not appear as expected.

2. The method of claim 1 wherein said system is placed in said state of confidence after a first predetermined number of successive synchronizing signals appear as expected.

3. The method of claim 2 wherein said window is reduced to a minimum responsive to a second predetermined number of successive synchronizing signals appearing as expected.

4. The method of claim 3 wherein said system is removed from said state of confidence responsive to a third predetermined number of synchronizing signals not appearing as expected.

5. The method of operating a multi-standard synchronizing pulse recovery system comprising:
operating a counter to establish a time window during which a synchronizing pulse in a signal is expected to occur;
storing the count of said counter when a synchronizing pulse occurs as expected;
resetting said counter and generating a sync output for each successive synchronizing pulse occurring as expected within the time window;
determining that a state of periodicity exists for said signal responsive to the occurrence of a first predetermined number of successive synchronizing pulses as expected;
during the existence of said state of periodicity for said signal, progressively reducing the size of the time window to a minimum responsive to occurrence of a second predetermined number of successive synchronizing pulses occurring as expected; and
during the existence of said state of periodicity for said signal, resetting said counter and generating a sync output for synchronizing pulses that do not occur as expected.

6. The method of claim 5 further including determining that a state of non-periodicity exists for said signal after a third predetermined number of successive synchronizing pulses do not occur as expected.

7. The method of claim 6 further including resetting said counter and generating a default sync output when the count of said counter exceeds a number corresponding to the maximum size time window.

* * * * *